(12) United States Patent
Rimminen

(10) Patent No.: US 9,151,641 B2
(45) Date of Patent: Oct. 6, 2015

(54) ADAPTOR COMPONENT FOR A MEASURING SYSTEM

(75) Inventor: Henry Rimminen, Helsinki (FI)

(73) Assignee: ELSI TECHNOLOGIES OY, Vantaa (FI)

(*) Notice: Subject to any disclaimer, the term of this patent is extended or adjusted under 35 U.S.C. 154(b) by 327 days.

(21) Appl. No.: 12/934,602

(22) PCT Filed: Mar. 24, 2009

(86) PCT No.: PCT/FI2009/050220
§ 371 (c)(1),
(2), (4) Date: Sep. 24, 2010

(87) PCT Pub. No.: WO2009/118453
PCT Pub. Date: Oct. 1, 2009

(65) Prior Publication Data
US 2011/0068808 A1 Mar. 24, 2011

(30) Foreign Application Priority Data
Mar. 26, 2008 (FI) .................................. 20080235

(51) Int. Cl.
*G01R 27/26* (2006.01)
*G01D 5/24* (2006.01)

(52) U.S. Cl.
CPC .................................. *G01D 5/2405* (2013.01)

(58) Field of Classification Search
CPC ..... G01R 27/2605; G01D 5/24; G01D 5/2405
USPC ........................... 324/658–690; 345/173–178
See application file for complete search history.

(56) References Cited

U.S. PATENT DOCUMENTS

| | | | | |
|---|---|---|---|---|
| 3,372,319 A | * | 3/1968 | Rhodes | 361/280 |
| 3,525,937 A | | 8/1970 | Mozer | |
| 4,305,007 A | * | 12/1981 | Hughes | 307/116 |
| 5,053,757 A | * | 10/1991 | Meadows | 345/173 |
| 5,073,757 A | * | 12/1991 | George | 324/677 |
| 5,463,388 A | * | 10/1995 | Boie et al. | 341/33 |
| 5,469,364 A | * | 11/1995 | Hughey et al. | 702/65 |
| 5,661,269 A | * | 8/1997 | Fukuzaki et al. | 178/19.06 |
| 5,714,984 A | * | 2/1998 | Fukuzaki et al. | 345/174 |
| 5,760,715 A | * | 6/1998 | Senk et al. | 341/33 |

(Continued)

FOREIGN PATENT DOCUMENTS

| | | |
|---|---|---|
| EP | 0647833 A1 | 4/1995 |
| GB | 2136138 A | 9/1984 |
| WO | 94/22026 A1 | 9/1994 |

OTHER PUBLICATIONS

Microchip Inductive Touch Sensor Design, Feb. 1, 2008, http://automatizace.hw.cz/files/images/files/01239A.pdf.*

(Continued)

*Primary Examiner* — Patrick Assouad
*Assistant Examiner* — Demetrius Pretlow
(74) *Attorney, Agent, or Firm* — Birch, Stewart, Kolasch & Birch, LLP

(57) ABSTRACT

The circuit arrangement according to the invention comprises a measuring apparatus that measures an electrical connection, and also one or more conductor patterns. The conductor pattern is connected to the measuring apparatus using an adaptor component, which fits the impedance produced by the conductor pattern to be suitable for the measuring apparatus.

8 Claims, 1 Drawing Sheet

(56) References Cited

U.S. PATENT DOCUMENTS

Figure 1:
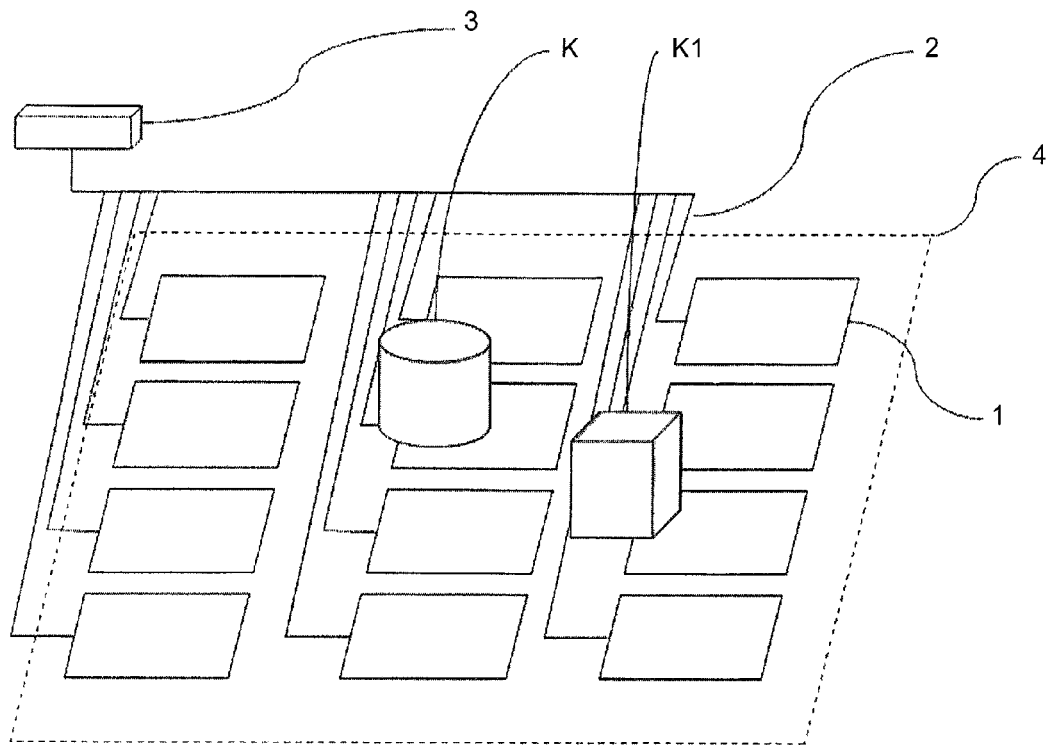

| | | | |
|---|---|---|---|
| 6,304,091 B1* | 10/2001 | Shahoian et al. | 324/662 |
| 6,373,474 B1* | 4/2002 | Katabami | 345/173 |
| 6,407,556 B1* | 6/2002 | Rudeke | 324/663 |
| 6,452,514 B1* | 9/2002 | Philipp | 341/33 |
| 6,466,036 B1* | 10/2002 | Philipp | 324/678 |
| 6,647,133 B1* | 11/2003 | Morita et al. | 382/124 |
| 6,720,777 B2* | 4/2004 | Wang | 324/680 |
| 6,744,258 B2* | 6/2004 | Ishio et al. | 324/548 |
| 6,995,573 B2* | 2/2006 | Becker et al. | 324/655 |
| 7,006,078 B2* | 2/2006 | Kim | 345/173 |
| 7,023,221 B1* | 4/2006 | Lin | 324/662 |
| 7,205,780 B2* | 4/2007 | Pasero et al. | 324/667 |
| 7,521,941 B2* | 4/2009 | Ely et al. | 324/678 |
| 7,667,612 B2* | 2/2010 | Sepponen | 340/665 |
| 7,881,624 B2* | 2/2011 | Kweon et al. | 399/27 |
| 2003/0107388 A1 | 6/2003 | Reed et al. | |
| 2005/0001633 A1* | 1/2005 | Okushima et al. | 324/658 |
| 2005/0052429 A1* | 3/2005 | Philipp | 345/173 |
| 2005/0231147 A1* | 10/2005 | Urman et al. | 318/465 |
| 2005/0231215 A1* | 10/2005 | Gozzini | 324/663 |
| 2007/0024592 A1* | 2/2007 | Fry | 345/173 |
| 2007/0074913 A1* | 4/2007 | Geaghan et al. | 178/18.06 |
| 2007/0075710 A1* | 4/2007 | Hargreaves et al. | 324/658 |
| 2007/0159184 A1* | 7/2007 | Reynolds et al. | 324/662 |
| 2007/0247438 A1* | 10/2007 | Ryynanen et al. | 345/173 |
| 2007/0262966 A1* | 11/2007 | Nishimura et al. | 345/173 |
| 2007/0268272 A1* | 11/2007 | Perski et al. | 345/173 |
| 2008/0007534 A1* | 1/2008 | Peng et al. | 345/173 |
| 2008/0047764 A1* | 2/2008 | Lee et al. | 178/18.06 |
| 2008/0111714 A1* | 5/2008 | Kremin | 341/33 |
| 2008/0150551 A1* | 6/2008 | Kim | 324/658 |
| 2009/0127003 A1* | 5/2009 | Geaghan | 178/18.03 |

OTHER PUBLICATIONS http://www.merriam-webster.com/dictionary/coplanar.*

* cited by examiner

ADAPTOR COMPONENT FOR A MEASURING SYSTEM

FIELD OF THE INVENTION

This invention relates to a measuring system of an electrical connection and to an adaptor component to be connected to the measuring system.

PRIOR ART

In prior-art solutions apparatuses that measure the electrical connection of an electrode are implemented with a fairly large plurality of components that includes e.g. AD (analog to digital) converters, DA (digital to analog) converters, multiplexers, components intended to regulate the voltage, and also capacitors, resistors and coils. In addition, a transformer according to the impedance of the measuring point is used in some prior-art solutions as an adaptor between the measuring apparatus and the measuring point. These types of measuring arrangements and measuring apparatuses that are implemented with a fairly large amount of components are complex and high in terms of their costs e.g. owing to the complexity, which is problematic for their use in applications in which the high costs of the measuring arrangement are detrimental or are an obstacle to the use of the solution.

Integrated multichannel capacitance measuring components have been developed for implementing the user interface of small apparatuses with capacitive touch sensors that measure an electrical connection. In some prior-art solutions a keyboard that detects touch is implemented with a capacitance measurement using thin or film-like single-electrode sensors. In this type of solution the electrical connection to the electrodes of the other buttons and/or to elsewhere in the environment is measured to detect a touch exerted on a button. An example of the components used in these types of solutions is Analog Device™'s CapTouch™ product family of capacitance-to-digital converter (CDC) microcontrollers. The measuring range of these types of microcontrollers is restricted to the measurement of capacitance changes in cases in which the total capacitance is at most a few tens of picofarads.

The advantages of a microcontroller used for capacitance measurement are e.g. the simplicity of the circuit solution based on it, the small amount of components required by the solution and the small need for space, the small number of circuit board layers required, and also the low current consumption and small power requirement achieved with the solution.

One problem of prior-art solutions is the limited measuring range of apparatuses and components that are inexpensive in price and suited to measuring an electrical connection. They are well suited e.g. to the implementation of touch-sensitive keyboards that utilize small-scale electrodes, but sensor solutions that are larger in size are of such large capacitance that the impedance implemented at the measuring frequency is so low in connection with them that CDC microcontrollers or corresponding components, although inexpensive in price, are not suited for use in measuring.

One prior-art application of impedance measurement is detecting objects situated or moving in the proximity of conductor patterns based on the measurement of the impedance levels of the conductor patterns. One prior-art solution is described in the patent publication U.S. Pat. No. 6,407,556 (Sensor for indicating changes in the presence of persons or objects). The electrical connection to be measured that is determined by the size of the typical conductor pattern to be used in these types of measuring arrangements, by the structures surrounding it and by other factors corresponds in its scale of magnitude typically to a capacitance of 1-30 nanofarads (nF).

BRIEF DESCRIPTION OF THE INVENTION

The invention is characterized by what is mentioned in the claims.

The invention presents a circuit arrangement used in capacitance measurement, by using which the measuring apparatus is fitted to the conductor patterns used as sensors in the measuring arrangement, when the impedances measured by means of the conductor patterns are low.

The system according to the invention for measuring an electrical connection comprises a measuring apparatus that measures capacitance, and also one or more conductor patterns. The invention is characterized in that the conductor pattern is connected to the measuring apparatus using an adaptor component, which fits the impedance produced by the conductor pattern to be suitable for the measuring apparatus. The adaptor component can be e.g. a resistor, a capacitor or a coil, which at the measuring frequency produces a suitable impedance when connected to the conductor pattern and to the measuring apparatus.

In some embodiments of the invention the adaptor component can be a separate component, which can be connected to the measuring apparatus and to the conductor pattern e.g. in the installation phase of the system. In some other embodiments of the invention, the adaptor component can be a component that is permanently connected to the measuring apparatus. Further, in some other embodiments of the invention, the adaptor component can be a component that is permanently connected to the conductor field.

The invention can also relate to an adaptor component that is characterized in that it fits the impedance produced by the conductor pattern to be suitable for the measuring apparatus.

The invention can further relate to a conductor field comprising one or more conductor patterns, which conductor field comprises one or more adaptor components, which fit the impedance produced by the conductor patterns to be suitable for the measuring apparatus.

The area of an individual conductor pattern of a conductor field can be e.g. at least 5, 50 or 500 square centimeters.

The invention can further relate to a measuring apparatus, which comprises an adaptor component, which fits the impedance produced by the conductor pattern to be suitable for the measuring apparatus. The smallest impedance handled by the measuring apparatus can correspond at the measuring frequency to e.g. a capacitance of at most 60 picofarads or 100 picofarads. The measuring frequency used by the measuring appliance can be e.g. 250 kHz. The capacitance produced by a conductor pattern can in some embodiments be at their largest e.g. at least 101 or 200 picofarads and in some other embodiments (e.g. with some other conductor patterns) at most 5 nanofarads. The adaptor component is preferably dimensioned to raise the impedance produced by the conductor pattern to an impedance sufficiently great to be suited to the measuring apparatus. For example, a conductor pattern that at its largest produces a capacitance of 200 picofarads can be fitted with an 80-picofarad serial capacitor to an apparatus that measures a capacitance of at most 60 picofarads, or a conductor pattern that at its largest produces a capacitance of 5 nanofarads can be fitted with a 60-nanofarad serial capacitor to the same type of measuring apparatus. On the other hand, e.g. a conductor pattern that at its largest produces a capacitance of 200 picofarads can be fitted with a 200-picofarad serial capacitor to an apparatus that measures a capacitance of at most 100 picofarads.

The adaptor component can comprise e.g. one or more capacitors. In some preferred embodiments the adaptor component comprises at least one capacitor per conductor pattern. The adaptor component can be connected e.g. in series between the conductor pattern and the measuring apparatus.

The circuit arrangement according to the different embodiments of the invention for connecting the measuring apparatus to the sensors enables e.g. an electrical fitting between the measuring apparatus and the sensors such that the same type of measuring apparatus can be used in connection with sensor arrangements that differ greatly in their electrical properties.

The invention also relates to an arrangement that comprises one or more conductor patterns as well as measuring means for measuring the electrical connections between conductor patterns. The arrangement comprises adaptor means for fitting the impedance produced by the connection between the conductor pattern and its environment to the aforementioned measuring means (3).

The aforementioned adaptor means according to one preferred embodiment fit the capacitance of the conductor pattern connected to the measuring means to be suitable capacitance for the measuring means.

The aforementioned adaptor means according to one preferred embodiment comprise one or more capacitors.

The aforementioned adaptor means according to one preferred embodiment are connected in series with the aforementioned conductor pattern.

The aforementioned adaptor means according to one preferred embodiment are suited for measuring means, the capacitance measuring range of which extends to at most 100 pF.

The aforementioned adaptor means according to one preferred embodiment are at their largest suited for connecting to a conductor pattern that produces at least 101 pF capacitance.

One possible advantage of the circuit arrangement according to the invention with respect to prior-art solutions can be that a microcontroller designed and intended for another purpose of use, and more particularly for another size scale, can be used as the measuring module, which microcontroller contains a large amount of the means needed in the measuring and comprises a large amount of the methods needed in the measurement. A measuring apparatus using this type of microcontroller can be implemented with a small amount of components and with a simple circuit arrangement and circuit board, and is typically inexpensive in its total costs. Further advantages of the circuit arrangement according to the invention are its reliability and low current consumption. A further advantage of the circuit arrangement according to the invention can be the simplicity of the measuring apparatus achievable with the programmability of the microcontroller and the suitability for use in different measuring points. Yet a further advantage of the circuit arrangement according to the invention can be that large amounts of the same measuring apparatus can be manufactured simply by selecting the components used in the fitting for each purpose of use, with which solution considerable savings in design costs and manufacturing costs can be achieved. Yet a further advantage of the circuit arrangement according to the invention can be that the only the measuring apparatuses, without the components used in the fitting, can be stored for use in the various purposes of use such that the components to be fitted are only installed according to the purpose of use and/or the location of use.

DETAILED DESCRIPTION OF THE INVENTION

In the following the invention will be described in more detail with reference to the embodiments presented as examples and to the attached drawings, wherein FIG. 1 presents a conductor arrangement, comprising a number of conductor patterns, used in one embodiment of the invention.

Figure 2:
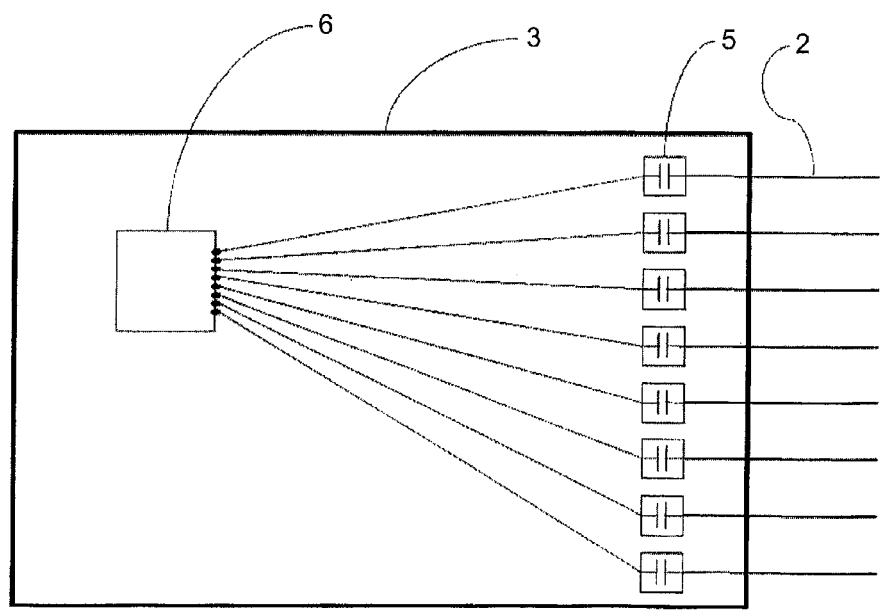

FIG. 2 presents a circuit arrangement used in one embodiment of the invention.

FIG. 1 presents a measuring arrangement used in one embodiment of the invention. The conductor patterns (1) installed as a group (4) under the floor surface are connected with sensor conductors (2) to the measuring apparatus (3). The conductor patterns are surrounded with insulation and each conductor pattern is connected only to the sensor lead that is connected to the measuring apparatus. The measuring apparatus measures the alternating current by using the electrical connection of each conductor pattern to the other conductor patterns and/or to the structure surrounding the conductor patterns. The measuring arrangement is used for measuring and monitoring the strengths of an electrical connection specific to a conductor pattern in order to detect objects (K, K1) disposed on or moving on the floor surface.

FIG. 2 presents a circuit arrangement used in one embodiment of the invention with respect to the arrangement that is in connection with the measuring apparatus. This part of the circuit arrangement comprises a microcontroller (6) used as the measuring module in the measuring and disposed in the measuring apparatus (3) and capacitors (5) connected in series to each sensor conductor (2). The microcontroller is a multichannel one and allows the connection and use of a number of parallel sensors in the measuring. The measuring component used makes an analog measurement and expresses the measurement result as a digital value. The microcontroller can be programmed to measure at the frequency used a sensor-specific electrical connection of a magnitude of at most twenty picofarads. The measuring apparatus can comprise other components and conductors, which are not presented in FIG. 2. The capacitor (5) is selected for the specific conductor pattern to be such that it changes the current to be measured that is implemented at the measuring frequency used in measuring the connection of the conductor pattern such that the current coincides with the range that the microcontroller (5) is fitted to measure. Typically a type of capacitor is selected that produces current occurring in the case of the connection that corresponds to the upper limit of the measuring range in the case of the strongest possible conductor pattern in question.

Procedures that differ in respect of the installation of the serial capacitors can be used in the different embodiments of the invention. The serial capacitors can be installed in the measuring apparatus e.g. permanently in connection with the manufacturing or when installing the measuring apparatus in connection with the installed conductor arrangement according to the conductor-specific electrical connection known and/or measurable at the time.

The serial capacitor used according to the different embodiments of the invention limits the current passing through the circuit to be measured. The alternating current used in the resistance measurement of the capacitor is inversely proportional to the capacitance of the capacitor. The total capacitance of the circuit to be measured is the inverse of the sum of the inverses of individual capacitances, in which case the total capacitance cannot be formed to be greater than the capacitance of the limiting serial capacitor even if the connection of the conductor pattern were great.

The invention also relates to an arrangement that comprises one or more conductor patterns (1) as well as measuring means (3) for measuring the electrical connections between conductor patterns. The arrangement comprises adaptor means (5) for fitting the impedance produced by the connection between the conductor pattern (1) and its environment to the aforementioned measuring means (3).

The aforementioned adaptor means (5) according to one preferred embodiment fit the capacitance of the conductor pattern (1) connected to the measuring means (3) to be suitable capacitance for the measuring means.

The aforementioned adaptor means (5) according to one preferred embodiment comprise one or more capacitors.

The aforementioned adaptor means (5) according to one preferred embodiment are connected in series with the aforementioned conductor pattern (1).

The aforementioned adaptor means (5) according to one preferred embodiment are suited for measuring means (3), the capacitance measuring range of which extends to at most 100 pF.

The aforementioned adaptor means (5) according to one preferred embodiment are at their largest suited for connecting to a conductor pattern (1) that produces at least 101 pF capacitance.

It is obvious to the person skilled in the art that the exemplary embodiments presented above are for the sake of clarity comparatively simple in their structure and function. Following the model presented in this patent application it is possible to construct different and also very complex solutions that utilize the inventive concept presented in this patent application.

The invention claimed is:

1. A measuring apparatus comprising:
    one or more coplanar conductor patterns, wherein each of the coplanar conductor patterns has a rectangular side surface and a flat top surface, and each of the flat top surfaces of the coplanar conductor patterns is at a same vertical level;
    a measuring device configured to measure an impedance produced by an electrical connection between the one or more coplanar conductor patterns and a corresponding conductor pattern environment; and
    a capacitor-based adaptor connected in series between the measuring device and the one or more coplanar conductor patterns and configured to adapt the impedance produced by the electrical connection to the measuring device,
    wherein a measuring range of the measuring device, without the capacitor-based adaptor, is outside a range of impedance produced by the electrical connection,
    wherein the capacitor-based adaptor is adapted to fit the impedance produced by the electrical connection to the measuring device, and
    wherein the impedance produced by the electrical connection is measured by the measuring device to monitor a strength of the electrical connection in the one or more coplanar conductor patterns, and detect at least one object within a proximity of the one or more coplanar conductor patterns.

2. The apparatus according to claim 1, wherein the capacitor-based adaptor comprises one or more capacitors.

3. The apparatus according to claim 1, wherein a capacitance measuring range of the capacitor-based adaptor extends to at most 100 pF.

4. The apparatus according to claim 3, wherein the capacitor-based adaptor is configured to connect to a conductor pattern of the one or more conductor patterns that produces at least 101 pF capacitance.

5. The apparatus according to claim 1, further comprising:
    a floor surface on which the at least one object is placed to be detected by the one or more coplanar conductor patterns,
    wherein the one or more coplanar conductor patterns are installed as a group under the floor surface.

6. The apparatus according to claim 1, wherein the one or more coplanar conductor patterns are one or more coplanar capacitive conductor patterns, respectively, and
    wherein each of the one or more coplanar conductor patterns is surrounded with insulation and connected only to a single sensor lead connected to the measuring device.

7. The apparatus according to claim 6, wherein each of the one or more coplanar capacitive conductor patterns produces a capacitance of 200 pF, and
    wherein the capacitor-based adaptor is a 200 pF capacitor-based adaptor that raises the impedance produced by a corresponding 200 pF coplanar capacitive conductor pattern among the one or more coplanar capacitive conductor patterns to be sufficiently great to be measurable by the measuring apparatus.

8. The apparatus according to claim 6, wherein the measuring device measures an alternating current of an electrical connection between each of the one or more coplanar capacitive conductor patterns and the other one or more coplanar capacitive conductor patterns, and between each of the one or more coplanar capacitive conductor patterns and a structure surrounding the one or more coplanar capacitive conductor patterns, and
    wherein an alternating current used in a resistance measurement of the capacitor-based adaptor is inversely proportional to a capacitance of the capacitor-based adaptor.

* * * * *